United States Patent
Bernard

(10) Patent No.: US 7,978,544 B2
(45) Date of Patent: *Jul. 12, 2011

(54) METHODS FOR PROVIDING A UNIFIED VIEW OF A DOMAIN MODEL TO A USER

(75) Inventor: Emmanuel Bernard, Atlanta, GA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/715,332

(22) Filed: Mar. 1, 2010

(65) Prior Publication Data

US 2010/0217778 A1 Aug. 26, 2010

Related U.S. Application Data

(63) Continuation of application No. 11/809,282, filed on May 30, 2007, now Pat. No. 7,689,535.

(51) Int. Cl.
*G11C 7/10* (2006.01)
(52) U.S. Cl. ........... 365/189.17; 365/49.17; 365/189.07; 700/1; 700/100; 700/101; 700/104; 700/200
(58) Field of Classification Search ............... 365/49.17, 365/189.17, 189.07; 700/1, 100, 101, 104, 700/200
See application file for complete search history.

(56) References Cited

U.S. PATENT DOCUMENTS

| | | | |
|---|---|---|---|
| 5,850,544 A * | 12/1998 | Parvathaneny et al. ....... 717/108 |
| 7,590,654 B2 | 9/2009 | Gupta et al. | |
| 7,689,535 B2 * | 3/2010 | Bernard ................. 707/999.001 |
| 2004/0049522 A1 | 3/2004 | Streepy, Jr. | |
| 2006/0277201 A1 | 12/2006 | Dorsett, Jr. | |
| 2008/0114724 A1 | 5/2008 | Indeck et al. | |

OTHER PUBLICATIONS

"Hibernate Annotations," Reference Guide, Version 3.3.0.GA, 58 pages.
"Hibernate Entity Manager," User Guide, Version 3.3.0.GA, 52 pages.
"Hibernate Reference," Documentation, Version 3.2.2.GA, 229 pages.
"Hibernate Search," Apache Lucene Integration, Version 3.0.0.Beta1, 22 pages.
"Hibernate Shards," Horizonal Partitioning with Hibernate, Version 3.0.0.Beta1, 20 pages.
Red Hat Office Action for U.S. Appl. No. 11/809,282 (P084) mailed Jun. 24, 2009.
Red Hat Notice of Allowance for U.S. Appl. No. 11/809,282 (P084) mailed Nov. 18, 2009.

* cited by examiner

*Primary Examiner* — Hoai V Ho
*Assistant Examiner* — Fernando N Hidalgo
(74) *Attorney, Agent, or Firm* — Lowenstein Sandler PC

(57) ABSTRACT

Techniques for providing a unified view of a domain model to a user are described herein. In one embodiment, in response to a first search query received from a client via a first search mechanism (e.g., outside of the relational DB) for a list of persistent objects representing data entries of a relational database, it is determined whether the persistent objects have been accessed via a second search query via a second search mechanism based on an object identifier of the persistent object. If the requested persistent object has been accessed via a second search query, an identical instance of the persistent object is returned to the client as a result of the first search query. Other methods and apparatuses are also described.

15 Claims, 7 Drawing Sheets

| Object Instances | Persistent Object ID | Persistent Object Type |
|---|---|---|
| Instance 1 | POID 1 | PO Type 1 |
| Instance 2 | POID 2 | PO Type 2 |
| ... | ... | ... |
| Instance n | POID n | PO Type n |

FIG. 5

METHODS FOR PROVIDING A UNIFIED VIEW OF A DOMAIN MODEL TO A USER

RELATED APPLICATION

This application is a continuation of U.S. patent application Ser. No. 11/809,282, now U.S. Pat. No. 7,689,535, filed May 30, 2007, which is incorporated herein by reference.

FIELD

Embodiments of the invention relate to information retrieval systems; and more specifically, to methods to provide a unified view of a domain model to a user of information retrieval systems.

BACKGROUND

Full-text searching of data is becoming increasingly popular and significant in the computing world. For many years, the information-retrieval community has had to deal with the storage of documents and with the retrieval of documents based on one or more keywords. Since the burgeoning of the Internet and the feasibility of storing documents on-line, retrieval of documents based on keywords has become a complex problem. Conventional solutions to this problem typically involve the creation of an inverted index for searching documents. When contents of documents are updated, the corresponding index will be updated as well. However, there has been a lack of efficient ways to update the index without compromising the performance of the search engines.

In addition, when a search engine performs a full text search and a non-full text search such as a direct query search, in an object oriented computing environment, the objects returned from a conventional search engine would be different even though the objects are related to the same physical data entry in a database. As a result, an application that initiates the searches may have different views of the same data entry.

BRIEF DESCRIPTION OF THE DRAWINGS

Embodiments of the invention may best be understood by referring to the following description and accompanying drawings that are used to illustrate embodiments of the invention. In the drawings:

FIG. 5 is a block diagram illustrating a data structure which may be used with one embodiment of the invention.

DETAILED DESCRIPTION

In the following description, numerous details are set forth to provide a more thorough explanation embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1A:
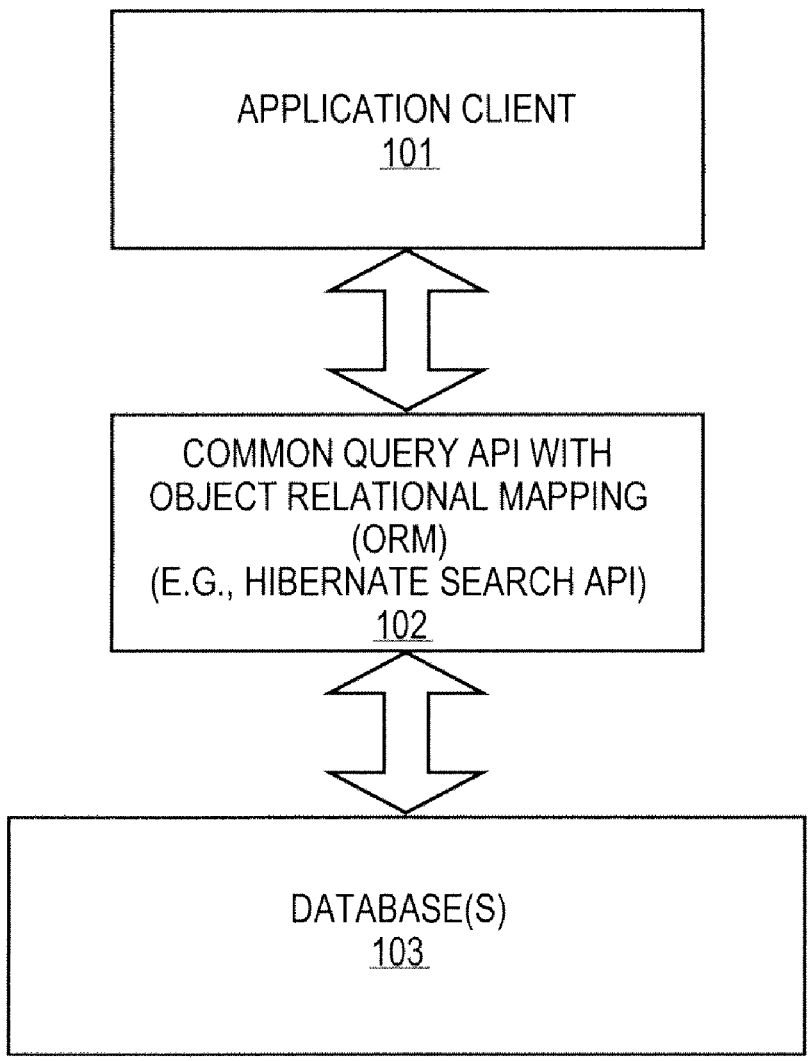
FIGS. 1A and 1B are block diagrams illustrating an application framework which may be used with certain embodiments of the invention.

FIG. 1A is a block diagram illustrating an application framework which may be used with one embodiment of the invention. Referring to FIG. 1A, framework 100 includes, but is not limited to, an application client 101 accessing a database 103 through a common query API (application programming interface) 102 with object-relational mapping (ORM) features. The API 102 provides the ability to map an object model's data representation to a relational data model and its corresponding database schema. For example, in a Java computing environment, the API 102 takes care of the mapping from Java classes to database tables and from Java data types to SQL (structured query language) data types used in a database. Note that throughout this application and for the purposes of illustration only, Java is used as an example of a cross-platform programming language. However, it is not so limited; other cross-platform (or not) programming languages may also be applied. The API 102 provides data query and retrieval facilities that reduce development time, which is designed to relieve a software developer from most of common data persistence-related programming tasks by reducing the need for manual, hand-crafted data processing using SQL and JDBC (Java database connectivity). The JDBC API is the industry standard for database-independent connectivity between the Java programming language and a wide range of databases—SQL databases and other tabular data sources, such as spreadsheets or flat files.

According to one embodiment, API 102 maintains a master search node and various slave search nodes to perform various queries on various databases. Each slave search node maintains a local copy of an index. Note that while commonly store in a directory, the actual index data can be store in a different form (in-memory or a single file—the actual implementation supporting directory and single file. An index is about a dataset contained in a database and the index is not per se related to the database. An index may be independent of the database vendor. In one embodiment, the master search node maintains a master copy of the index directory. Each slave search node performs a respective search using index information obtained from its local index copy and asynchronously updates the index information on the master copy via the master search node. In addition, each slave search node may periodically update its local index copy by replicating the index from the master copy maintained by the master search node. The operations of searches performed by a slave search node, index update in the master copy, and local index updates from the master copy may be performed asynchronously, for example, in separate threads, although under certain circumstances, the search operations may not be performed asynchronously; however, the index update operations are performed asynchronously.

In addition, according to another embodiment of the invention, API 102 may keep track which of the persistent objects are being accessed by an application. Since API 102 provides several ways to query a database, including a standard SQL query and a full text query, according to one embodiment, API 102 returns the same instance of a persistent object to various search queries if the same data entry (e.g., physical data entry in the database) is being accessed. As a result, API 102 provides a unified view (also referred to as a unified Object Oriented view) of a persistent data storage.

Figure 1B:
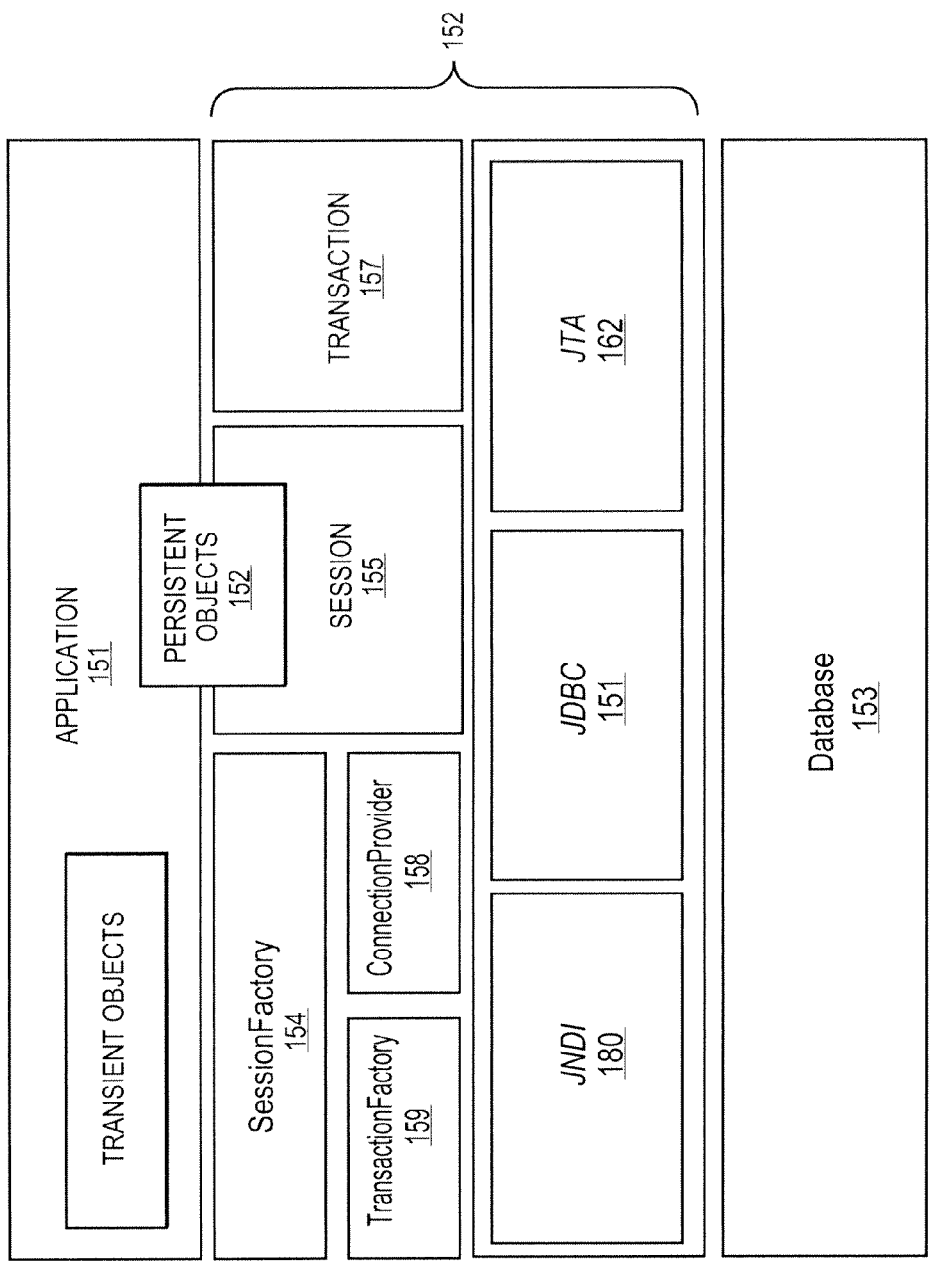

FIG. 1B is a block diagram illustrating an application framework according to an alternative embodiment of the invention. Referring to FIG. 1B, similar to framework 100 as shown in FIG. 1A, framework 150 includes, but is not limited to, an application 151 accessing database 153 via an application framework 152 which may be implemented as part of framework 102 of FIG. 1A. In this example, framework 152 is configured to provide persistent services to application 151.

Framework 152 includes a variety of components. For example, session factory 154 is configured to provide a thread-safe (immutable) cache of compiled mappings for a single database. Session factory 154 is a factory for session 155 and a client of connection provider 158 and it may hold an optional (e.g., second-level) cache of data that is reusable between transactions, at a process- or cluster-level. Session 155 is a single-threaded, short-lived object representing a conversation between the application 151 and the persistent store 153. Session 155 wraps one or several JDBC connection(s) and is optionally a factory for transaction 157. Session 155 holds a mandatory (first-level) cache of persistent objects, which are used when navigating an object graph or looking up objects based on an identifier.

Persistent objects 156 are short-lived, single threaded objects containing persistent state and business function. Persistent objects 156 may be ordinary JavaBeans/POJOs (plain old Java objects). Persistent objects 156 may be associated with a session (e.g., session 155). As soon as the associated session is closed, the persistent objects 156 will be detached and free to use in any application layer (e.g. directly as data transfer objects to and from presentation). Transaction 157 is a single-threaded, short-lived object used by the application to specify atomic units of work. Transaction 157 abstract applications from underlying JDBC (Java database connectivity), JTA (Java transaction API), and/or CORBA (common object request broker architecture) transactions. A session may span several transactions in some situations.

The JDBC API is the industry standard for database-independent connectivity between the Java programming language and a wide range of databases—SQL databases and other tabular data sources, such as spreadsheets or flat files. The JDBC API provides a call-level API for SQL-based database access. The JTA specifies standard Java interfaces between a transaction manager and the parties involved in a distributed transaction system, such as the resource manager, the application server, and the transactional applications. The CORBA is a standard defined by the Object Management Group (OMG) that enables software components written in multiple computer languages and running on multiple computers to interoperate. CORBA "wraps" program code into a bundle containing information about the capabilities of the code inside and how to call it. The resulting wrapped objects can then be called from other programs (or CORBA objects) across a network. CORBA uses an interface definition language (IDL) to specify the interfaces that objects will present to the world. CORBA then specifies a "mapping" from IDL to a specific implementation language like C++ or Java.

Referring back to FIG. 1B, connection provider 158 is a factory for (and pool of) JDBC connections. Connection provider 158, Session 155 and Transaction 157 abstracts application 151 from underlying data sources or driver managers (e.g., JNDI or Java naming and directory interface 160, JDBC 161, and JTA 162). Transaction factory 159 is a factory for transaction 157 instances. Framework 150 supports a variety of databases, including, for example, Oracle, DB2, Sybase, MS SQL server, MySQL, etc.

Further, framework 150 brings the power of full text search engines to the persistent domain model through transparent configuration and a common API. Full text search engines such as Apache Lucene allow applications to execute free-text search queries. However, it becomes increasingly more difficult to index a more complex object domain model—keeping the index up to date, dealing with the mismatch between the index structure and domain model, querying mismatches, etc. According to certain embodiments of the invention, framework 150 oversees the object/index transactions. Framework 150 manages the index, keeps changes synchronized with the database, and optimizes the index access transparently. The common API allows an application to query and retrieve managed objects as any regular SQL query would do. In one embodiment, an ORM usually hides a user from SQL by providing an Object Oriented query API or a Object Query Language (e.g., HQL, JPA-QL, OQL etc). Note that some or all of the components as shown in FIGS. 1A-1B may be implemented in hardware, software, or a combination of both hardware and software.

Figure 2:
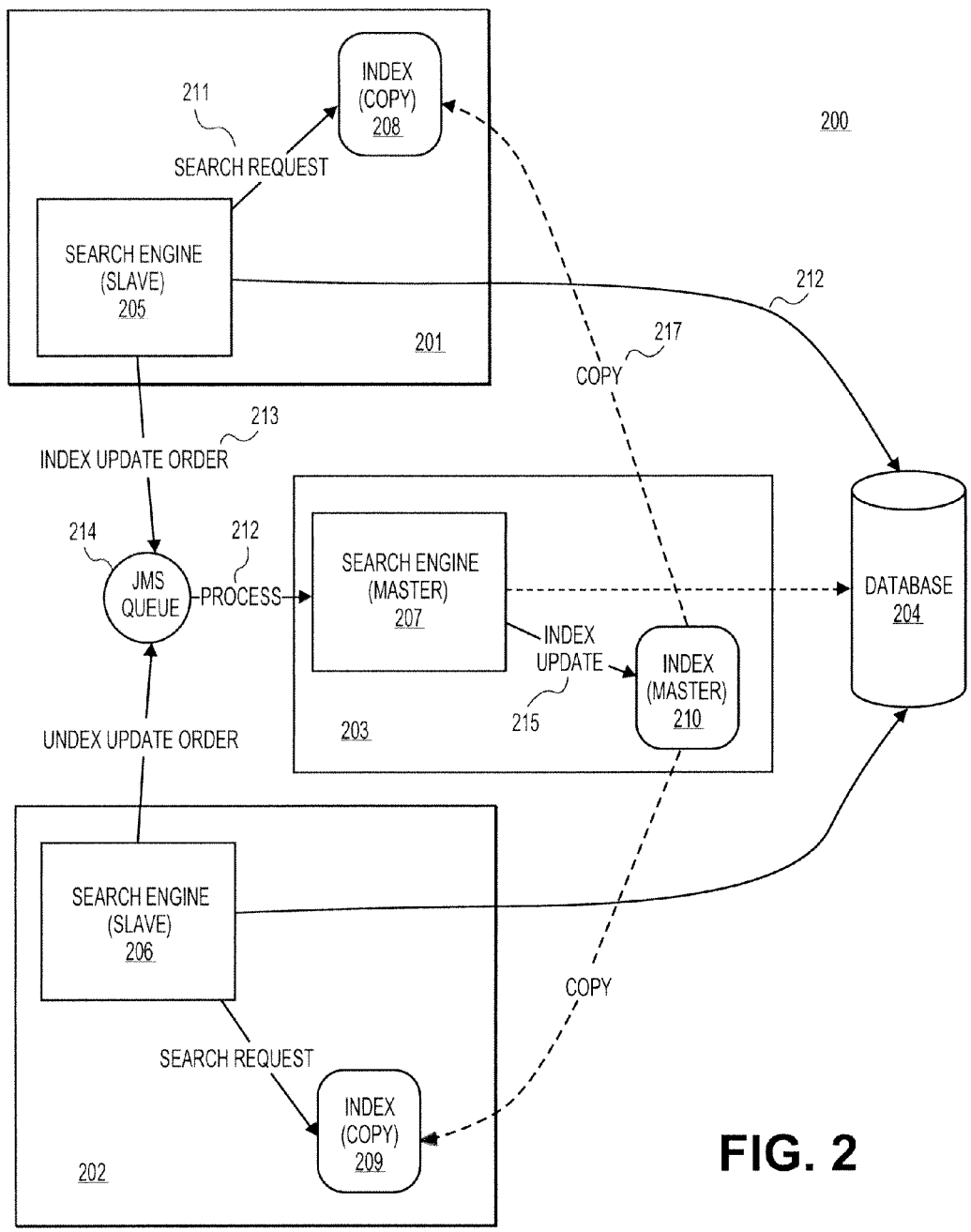
FIG. 2 is a block diagram illustrating a process for updating index related to the data stored in a relational database according to one embodiment of the invention.

FIG. 2 is a block diagram illustrating a process for updating index of data stored in a relational database according to one embodiment of the invention. Process 200 may be performed by the application frameworks as shown in FIGS. 1A and 1B. For example, process 200 may be performed as a part of a search facility maintained by the common API. Referring to FIG. 2, process 200 involves multiple search nodes as slave search nodes 201-202 for performing a variety of queries to database 204, which may include multiple databases using a variety of access protocols such as, JNDI, JTA, and JDBC, etc. Each of the slave search nodes 201-202 may be associated with a particular search session, a particular application, a Java virtual machine, etc.

In one embodiment, each of slave search nodes 201-202 includes a search engine (e.g., search engines 205-206) and a local copy of index directory (e.g., index directories 208-209) associated with the database 204. In addition, a master search node 203 is used to maintain a master copy of index directory 210 and master search node 203 is responsible for updating the master index 210 in response to any updates to database 204 (for example, made through Common API by any of the slave nodes). The copies of index 205-206 and the master index 210 enable the slave search nodes to perform any full text searches initiated from applications.

A search engine is an information retrieval system designed to help find information stored in a database. A search engine uses regularly updated indexes to operate quickly and efficiently. In text retrieval, full text search (also referred to as free search text) refers to a technique for searching any content or databases; in a full text search, the search engine examines all of the words in every stored document as it tries to match search words supplied by the client. The most common approach to full text search is to generate a complete index or concordance for all of the searchable documents. For each word, an entry is made which lists the position of every occurrence of the word within the database of documents.

Referring back to FIG. 2, for the purposes of illustration, slave search node 201 invokes a search engine or an instance of a search engine 205 to perform a full text search using a local index copy 208. Specifically, when the slave search node 201 receives a full text query, the slave search node 201 invokes search engine 205 to perform the search. In response to the query, search engine 205 sends a search request via path 211 (e.g., a thread) to local index 208 based on one or more keywords of the search query. In return, search engine 205 receives a list of documents that match at least one queried keyword, where the list of documents may be ranked or sorted according to a variety of algorithms. The list may be paginated at the initial client request, and the paginated subset is converted into a list of domain objects. This conversion potentially triggers one or several requests to the database, the DB access may be optimized using various algorithms. Further, search engine 205 sends a request via path 212 to database 204 to retrieve the selected documents (more than one usually) from database 204. Thereafter, the documents are converted to their object representation.

When an entity is inserted, updated, or removed to/from the database 204 through the common API, in one embodiment, slave search node 201 schedules an index update event via a message provider, such as, for example, in this example, a Java message service (JMS) provider. In one embodiment, it is not an event per entity change, the common API may transparently queue several entity changes (e.g., per Transaction basis). When the queue is ready (e.g., transaction commit or some other event), the event containing all the queued changes is sent through JMS. This is important for various reasons such as, transaction coherence between the DB and the index, index process optimization. Note that throughout this application, JMS is used as an example of a message service; however, other message services may also be utilized. In one particular embodiment, when a data entry has been updated (e.g., inserted, modified, or deleted) in database 204, search engine 205, as a JMS producer, generates an index update event and sends (e.g., publish) the index update event (as well as the index update information) via path 213 to a JMS provider (not shown) which stores the index update event in JMS queue 214. Note that the update event may be scheduled on a per transaction basis, where an update event may be used to update multiple changes of multiple entities.

Meanwhile, search engine 207 (e.g., an indexing engine) of master search node 203, as a JMS subscriber, registers with the JMS provider to listen to the index update event. Eventually, the JMS provider notifies search engine 207 of master search node 203 regarding the index update event. In response, search engine 207 retrieves via path 212 the index update event from JMS queue 214 and updates via path 215 the master copy of index 210.

According to one embodiment, periodically, slave search node 201 may update its local index 208 by copying the master index 210 via path 217. The index replication process may be carried in a variety of ways. For example, each of the slave search nodes 201-202 may periodically poll the master search node 203 to replicate the master copy of index into its local copy. Alternatively, the master search node 203 may broadcast the index changes to the slave search nodes 201-202. Further, similar to the index update process, the index replication process may be performed via JMS. For example, when there are any updates on the master index, the master search node, as a JMS producer, publishes an index replication event in the JMS queue 214 (or a separate message queue). Meanwhile, each of the slave search nodes 201-202 may register, as a JMS subscriber, to listen to the index replication event. In this way, no index replication is needed unless there is an update in the master copy 210. Note that, according to one embodiment, only the changes or updates of the master index from a previous replication process may be replicated to the local indexes of the slave nodes.

Note that operations involved in paths 211-217 may be performed via independent threads which are processed concurrently and asynchronously. As a result, each of the slave search nodes 201-202 can focus on the actual searching of the queries and delegate the index update operations to the master search node 203. This may greatly improve the performance of each component involved in FIG. 2 as well as scalability of the overhaul architecture. Other configurations may exist. Also note that, system as described in FIG. 2 has been described for the purposes of full text searches; however, the system may also support ordinary SQL searches via path 212 without having to invoke index databases (e.g., local indexes 208-209 and master index 210).

Figure 3:
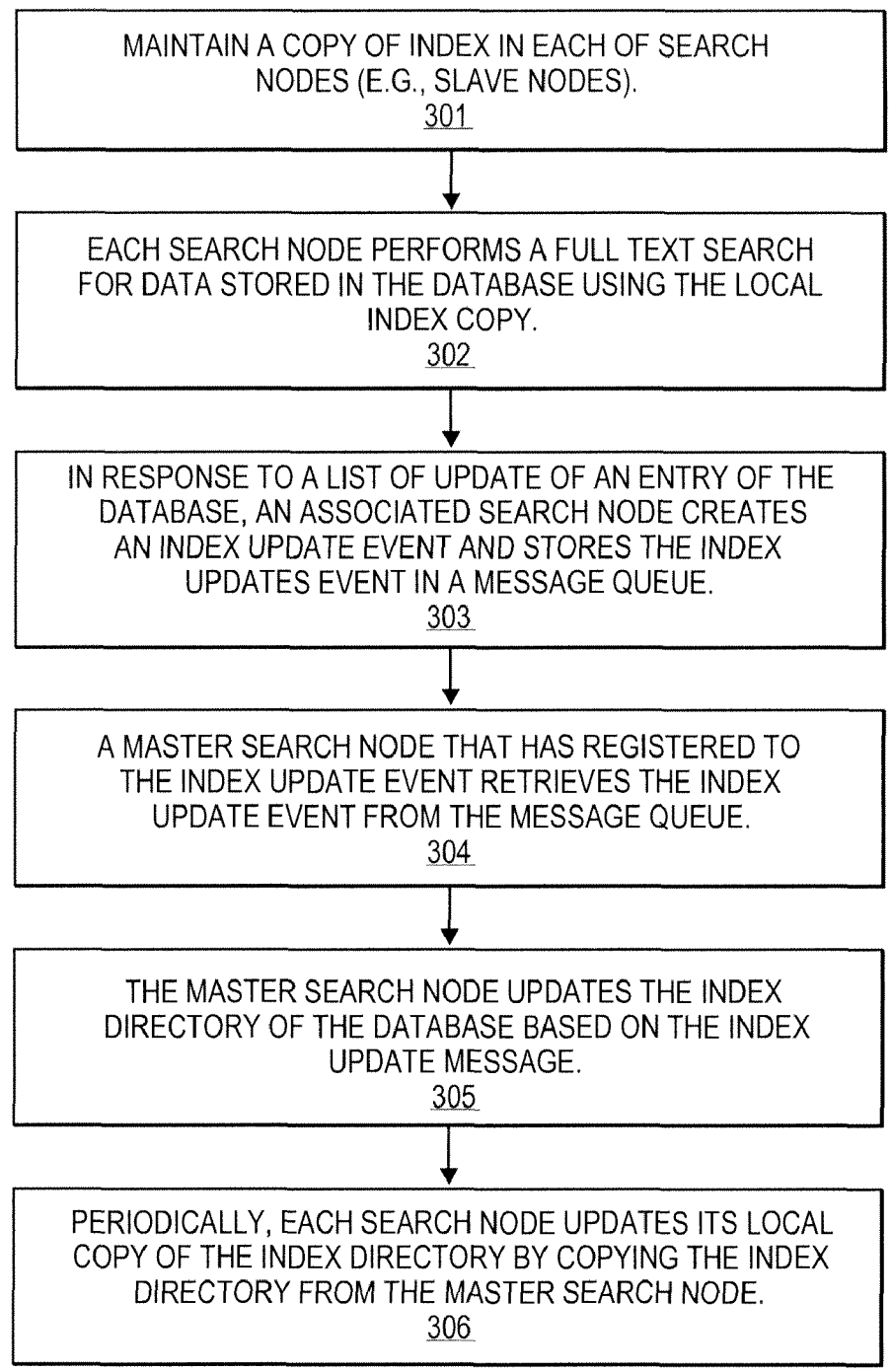
FIG. 3 is a flow diagram illustrating a process for process index updates in a full text search environment according to one embodiment of the invention.

FIG. 3 is a flow diagram illustrating a process for process index updates in a full text search environment according to one embodiment of the invention. Note that process 300 may be performed by processing logic which may include hardware, software, or a combination of both. For example, process 300 may be performed by systems as shown in FIGS. 1A-1B and 2. Referring to FIG. 3, at block 301, a local index copy is maintained by each of the slave search nodes. At block 302, each slave search node performs a full text search on data stored in the relational database using the respective local index copy. At block 303, in response to an update (e.g., a list) of data entries in the database in a given context (e.g., associated with a transaction), the corresponding slave search node creates an index update event and sends the index update event to a message service provider (e.g., JMS provider) which stores the index update event in a message queue. At block 304, a master search node, which has registered to subscribe or listen to the index update event, retrieves the index update event (as well as any necessary information for updating the master index copy) from the message queue and at block 305, the master search node updates the master index copy maintained by the master search node. At block 306, periodically, each of the slave search nodes updates its own local index copy by replicating (incrementally or not) the master index copy form the master search node. Other operations may also be performed.

In an object-oriented programming environment, object-relational mapping (ORM) is a common requirement of many software development projects. The activities involved in persisting data are tedious and error-prone. As described above with respect to FIGS. 1A-1B, the application framework allows an application to store any kind of objects; therefore, the application does not need to know that its data will be persisted during the operations of the framework. An object that has been persisted in a database is referred to as a persistent object. A persistent object is typically identified by its type and a unique object identifier, which may be automatically generated by a machine (e.g., UUID or universally unique identifier).

As described above in connection with FIG. 2, a persistent set of object may be queried by a direct SQL query or any of its Object Oriented abstraction (e.g., path 212). In one embodiment, the system has the ability to retrieve a particular persistent object if the application knows the object identifier of the persistent object. Alternatively, according other embodiments, a set of persistent objects can be queried via an index search on one or more keywords (e.g., criteria search), which returns a list of objects that contain at least one of the keywords (e.g., path 211), paginated or not, a list of associated persistent objects are returned to the client. However, a conventional query system returns different instances of the same persistent object if the client retrieves the same persistent object using different mechanisms (e.g., a direct SQL or any of its object oriented abstraction, or index search). As a result, a client receives two instances (e.g., handles) of objects even if they were referred to the same persistent object or the same data entry in the database.

Figure 4:
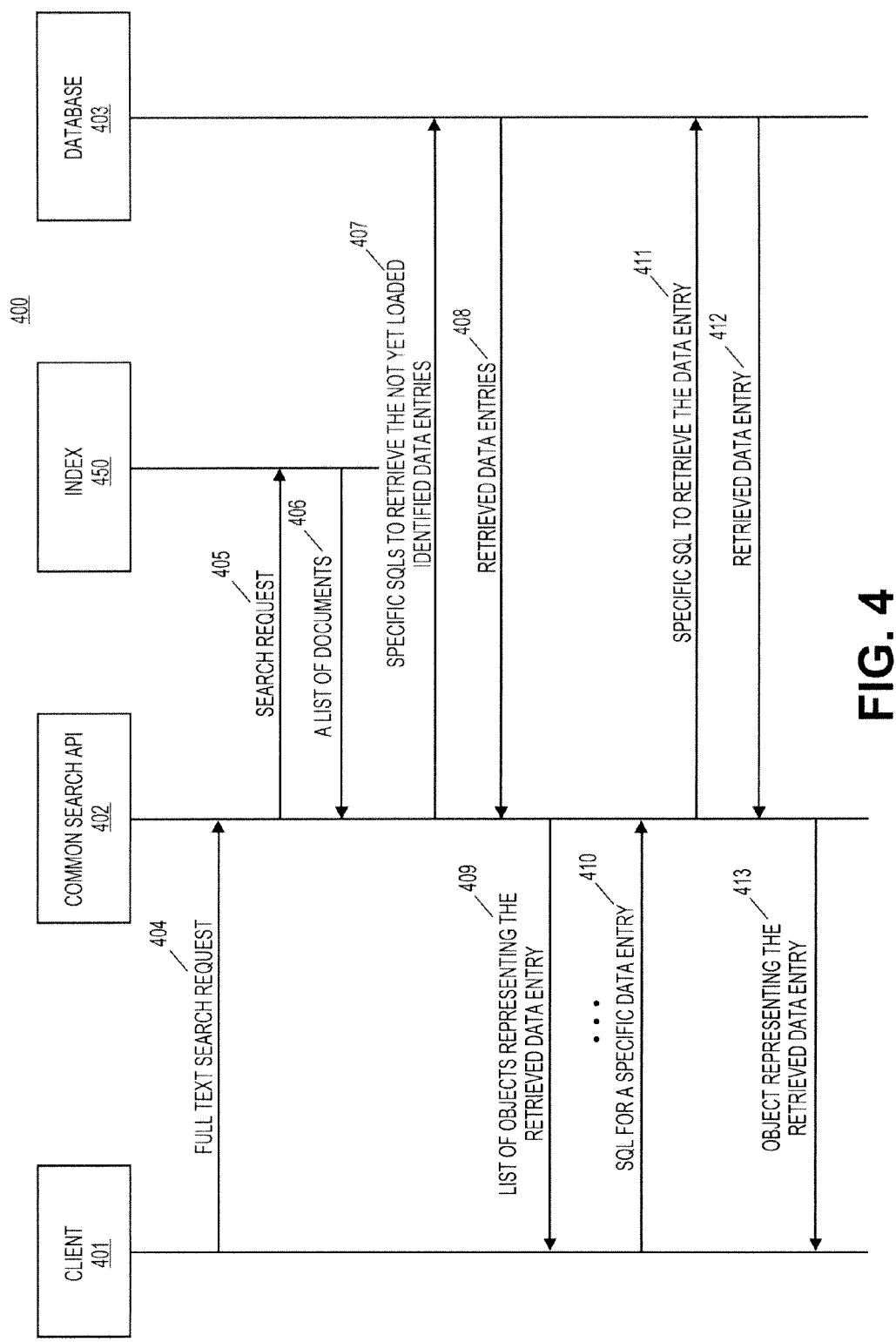
FIG. 4 is a process diagram illustrating a process to query a persistent object according to one embodiment of the invention.

FIG. 4 is a process diagram illustrating a process to query a set of persistent object according to one embodiment of the invention. For example, process 400 may be performed by system as shown in FIG. 2. Referring to FIG. 4, a client 401 (e.g., an application) transmits a full text search request to a common search API 402 (e.g., an application framework having a common API) in operation 404. In response, API 402 sends a search request to an index 450 via operation 405 (matching data being accessed in database 403). In response, index 450 returns via operation 406 to common API 402 a list of documents or objects that contain at least one of the keywords in the search request. In response, API 402 converts the list of documents into a list of persistent objects thanks to one or several database specific SQL requests if needed (e.g., JNDI, JTA, JDBC compatible requests) and sends via operation 407 to database 403. In response, during operation 408, API 402 receives the queried data entry from database 403 and converts the data entries into objects (e.g., persistent objects). Thereafter, API 402 returns a list of persistent objects (e.g., a handle or pointer) to the client 401 via operation 409. Note that operations 404-409 are involved during a full text search query.

Alternatively, as described above, API 402 can also handle a direct SQL query or any of its object oriented abstraction from client 401. Referring back to FIG. 4, during a direct SQL query or any of its object oriented abstraction, client 401 sends via operation 410 a SQL query (which is database independent) to API 402. In response API 402 converts the database independent SQL into a database specific (e.g., associated with database 403) SQL and sends the converted request via operation 411 to database 403. In return, API 402 receives the data entry via operation 412 from database 403. API 402 converts (e.g., mapping) the data entry into a list of objects (e.g., a persistent object) and sends via operation 413 the list back to the client 401.

In a conventional non integrated query system, the instances of objects returned via operations 404-409 (e.g., full text search) and via operations 410-413 (e.g., direct SQL queries) would be different even though both instances point to the same persistent object or same data entry in the database 403. However, based merely on the instances of objects returned, a user would not be able to tell whether these objects are linked to the same data entry in the database 403.

According to one embodiment, the application framework as described with respect to FIGS. 1A-1B and 2 maintains information regarding what persistent objects being accessed by an application in a given context (e.g., a transaction). For example, if an application retrieves a persistent object via a direct SQL query and subsequently, the same application retrieves the same persistent object via a full text search query, the same instance of the persistent object will be returned to the client, such that the client has a unified view of the same persistent object or data entry of the database.

FIG. 5 is a block diagram illustrating a data structure for maintaining mapping information between an instance of a persistent object and an object identifier of the persistent object, optionally as well as the object type of the object. As described above, each persistent object is identified by its type and a unique object identifier. By keeping track of the persistent object identifier, the framework would know which of the persistent objects are being accessed by a client. When a client subsequently accesses another object of the same type having the same object identifier, the framework may return the same instance of the existing object that corresponds to the object identifier.

Figure 6:
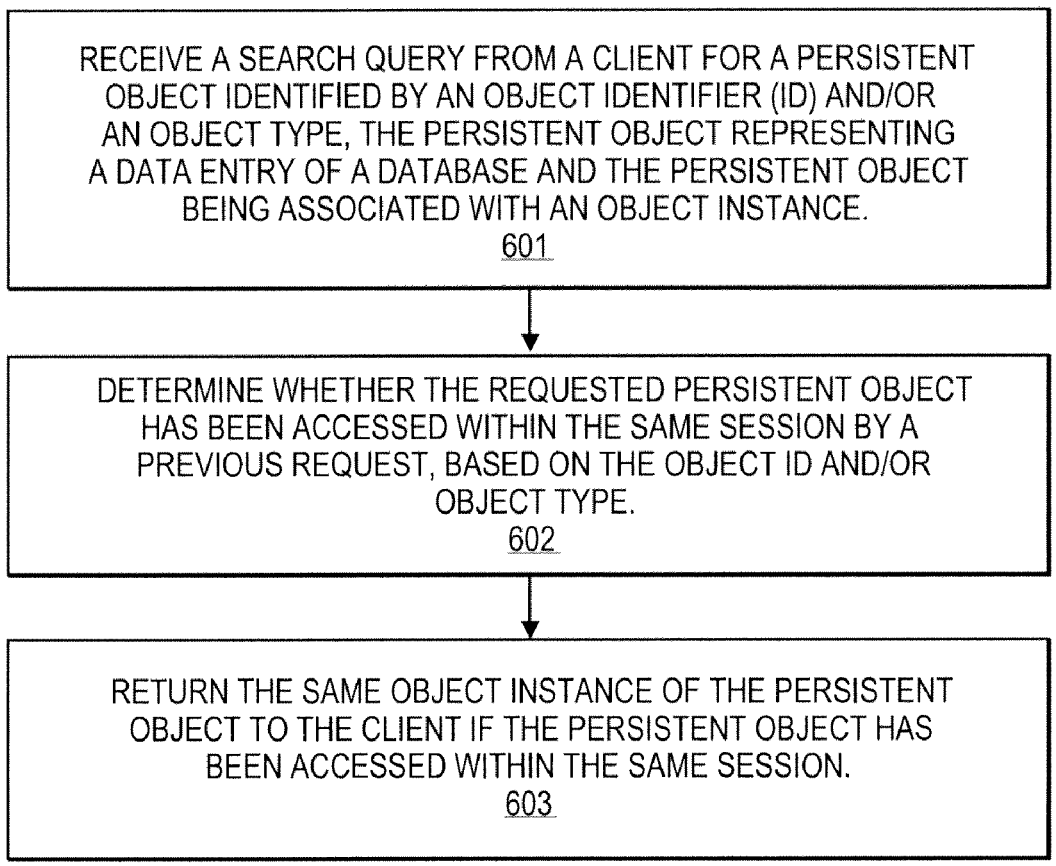
FIG. 6 is a flow diagram illustrating a process for retrieving a persistent object according to one embodiment.

FIG. 6 is a flow diagram illustrating a process for retrieving a persistent object according to one embodiment. Note that process 600 may be performed by processing logic which may include hardware, software, or a combination of both.

For example, process 600 may be performed by systems as shown in FIGS. 1A-1B and 2 described above. Referring to FIG. 6, at block 601, processing logic receives a search query from a client for a persistent object identifier by an object identifier and/or an object type. The persistent object represents a data entry of a database and is assigned with an object instance (e.g., handle). At block 602, processing logic determines whether the requested persistent object has been accessed within the same session or by the same application via a previous request based on the object identifier and/or object type. If so, at block 603, the same instance of the persistent object is returned to the client such that the client has a unified view of the persistent object and/or the associated data entry of the database. Other operations may also be performed.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A machine-implemented method, comprising:
   receiving a first search query for a list of persistent objects representing data entries of a relational database from a client via a first query and retrieval application programming interface (API), the first search query being a full-text search query having one or more keywords;
   determining whether each of the persistent objects has been accessed via a second search query previously received via a second query and retrieval API based on object identifiers of the persistent objects, the second search query being a structured query language (SQL) query; and
   returning, via the first query and retrieval API, an identical instance of the one or more persistent objects to the client as a result of the first search query if the one or more persistent objects have been previously accessed via the second search query, the identical instance of the one or more persistent objects being returned to the client without accessing the relational database.

2. The method of claim 1, wherein the second search query includes the object identifiers identifying the queried persistent objects.

3. The method of claim 2, wherein the object identifiers of the second search query correspond to object identifiers in a list or a subset of the list retrieved from the first full-text search query, wherein the list includes one or more documents containing at least one of the one or more keywords.

4. The method of claim 3, wherein the list of the one or more documents is obtained by searching the one or more keywords within an index directory.

5. The method of claim 1, wherein determining whether each of the persistent objects has been accessed via the second search query is further based on an object type and identifier of a corresponding persistent object.

6. A non-transitory machine-readable medium having instructions stored therein, which when executed by a machine, cause the machine to perform a method, the method comprising:
   receiving a first search query for a list of persistent objects representing data entries of a relational database from a client via a first query and retrieval application programming interface (API), the first search query being a full-text search query having one or more keywords;
   determining whether each of the persistent objects has been accessed via a second search query previously received via a second query and retrieval API based on object identifiers of the persistent objects, the second search query being a structured query language (SQL) query; and
   returning, via the first query and retrieval API, an identical instance of the one or ore persistent objects to the client as a result of the first search query if the one or more persistent objects have been previously accessed via the second search query, the identical instance of the one or more persistent objects being returned to the client without accessing the relational database.

7. The machine-readable medium of claim 6, wherein the second search query includes the object identifiers identifying the queried persistent objects.

8. The machine-readable medium of claim 7, wherein the object identifiers of the second search query correspond to object identifiers in a list or a subset of the list retrieved from the first full-text search query, wherein the list includes one or more documents containing at least one of the one or more keywords.

9. The machine-readable medium of claim 8, wherein the list of the one or more documents is obtained by searching the one or more keywords within an index directory.

10. The machine-readable medium of claim 6, wherein determining whether each of the persistent objects has been accessed via the second search query is further based on an object type and identifier of a corresponding persistent object.

11. A data processing system, comprising:
    a processor; and
    a memory coupled to the processor for storing instructions, which when executed from the memory, cause the processor to
    receive a first search query for a list of persistent objects representing data entries of a relational database from a client via a first query and retrieval application programming interface (API), the first search query being a full-text search query having one or more keywords;
    determine whether each of the persistent objects has been accessed via a second search query previously received via a second query and retrieval API based on object identifiers of the persistent objects, the second search query being a structured query language (SQL) query; and
    return, via the first query and retrieval API, an identical instance of the one or more persistent objects to the client as a result of the first search query if the one or more persistent objects have been previously accessed via the second search query, the identical instance of the one or more persistent objects being returned to the client without accessing the relational database.

12. The system of claim 11, wherein the second search query includes the object identifiers identifying the queried persistent objects.

13. The system of claim 12, wherein the object identifiers of the second search query correspond to object identifiers in a list or a subset of the list retrieved from the first full-text search query, wherein the list includes one or more documents containing at least one of the one or more keywords.

14. The system of claim 13, wherein the list of the one or more documents is obtained by searching the one or more keywords within an index directory.

15. The system of claim 11, wherein the processor is caused to determine whether each of the persistent objects has been accessed via the second search query based on an object type and identifier of a corresponding persistent object.

* * * * *